United States Patent [19]

Geer

[11] Patent Number: 5,930,778
[45] Date of Patent: Jul. 27, 1999

[54] SYSTEM FOR EXPEDITING THE CLEARING OF FINANCIAL INSTRUMENTS AND COORDINATING THE SAME WITH INVOICE PROCESSING AT THE POINT OF RECEIPT

[75] Inventor: Terry L. Geer, Baltimore, Ohio

[73] Assignee: Huntington Bancshares Incorporated, Columbus, Ohio

[21] Appl. No.: 08/680,218

[22] Filed: Jul. 11, 1996

Related U.S. Application Data

[63] Continuation-in-part of application No. 08/507,856, Jul. 27, 1995, Pat. No. 5,583,759, and a continuation of application No. 08/156,190, Nov. 22, 1993, abandoned.

[51] Int. Cl.[6] .................................................. G06F 17/60
[52] U.S. Cl. .............................. 705/45; 705/35; 235/379
[58] Field of Search .................................. 705/30, 33, 34, 705/35, 39, 40, 44, 45; 235/375, 379, 380, 381

[56] References Cited

U.S. PATENT DOCUMENTS

| | | | |
|---|---|---|---|
| 5,175,682 | 12/1992 | Higashiyama et al. | 705/45 |
| 5,198,975 | 3/1993 | Baker et al. | 705/45 |
| 5,237,159 | 8/1993 | Stephens | 235/379 |
| 5,265,007 | 11/1993 | Barnhard, Jr. et al. | 705/45 |
| 5,373,550 | 12/1994 | Campbell et al. | 379/100.11 |

*Primary Examiner*—Stephen R. Tkacs
*Attorney, Agent, or Firm*—Porter, Wright, Morris & Arthur

[57] ABSTRACT

A system and process are described for effecting the expedited submission into the payment system for collection of funds represented by financial instruments that are received by a payee at an item capture facility remote from the payee's depository bank in which the submission of the instruments into the payment system is coordinated with the payee's internal accounting process and the register of the deposit of the instruments with an account at the instruments payee's bank.

18 Claims, 2 Drawing Sheets

SYSTEM FOR EXPEDITING THE CLEARING OF FINANCIAL INSTRUMENTS AND COORDINATING THE SAME WITH INVOICE PROCESSING AT THE POINT OF RECEIPT

RELATED APPLICATIONS

This application is a continuation-in-part of Application for United States Letters patent Ser. No. 08/507,856 filed on Jul. 27, 1995, now U.S. Pat. No. 5,583,759, and as a continuation of Application for United States Letters patent Ser. No. 08/156,190 filed on Nov. 22, 1993, now abandoned. Both applications have the same inventor and assignee as the present invention and both are incorporated herein by reference for all purposes.

FIELD OF THE INVENTION

The present invention relates to a system for expedited processing of checks and cash items received by a payee with an accompanying payment form at an item capture facility to reduce the time within which such items are paid, or returned through the check payment system and the payees bank of first deposit, by the payor bank on which such items are drawn.

BACKGROUND OF THE INVENTION

This invention expedites the processing of a deposit by the payee of an instrument or payment order into a collecting and clearing bank (referred to generally as the payee bank, bank of first deposit, or depository bank). Such instruments and payment orders are prepared, processed, and submitted into the check payment system and are typically paper checks and other cash items. The deposit and collection of the funds represented by these instruments are expedited according to the system of the present invention. Benefits of the present invention are realized by banking customers that receive as payees large numbers of paper checks to process on a continuing basis, such as utilities, bill payment companies, credit card companies, mail order processors, or other large commercial entities.

Typically in the prior art, the deposit and payment of a check tendered to a payee for an amount due is effected in accordance with traditional procedures for paper-based processing. The drawer (the check writer) establishes an account containing funds with a bank of the drawer's choice (the drawee bank or the payor bank). A check or similar financial instrument is written against the drawer's account in favor of the payee and physically delivered to the payee, usually by mail accompanied by the payor's invoice or a payment stub provided to the check writer that provides information about the check writer's account with the payee. The payee typically indorses the checks and deposits the checks in the payee's account at its depository bank or bank of first deposit for processing through the payment system. The checks are ultimately presented at the check writer's payor bank for payment of the funds represented by the instrument. Internal accounting procedures of the payor reconcile the invoice and the payment with the payor's account with the payee. The payor's account is identified by a payment stub issued by the payee that the payor returns to the payee with the payment check. Upon receipt of the check, the payor bank debits funds from the drawer's account, and may archive the check or a copy of the check, and/or return the check to the check drawer. Thus, the payment cycle is completed, typically with the paper check or financial instrument making the complete cycle from drawer to payee, to depository bank, through the check clearing system to the payor bank for archival storage and/or return to the check drawer.

In the conventional check clearing systems, the payee first indorses a check and delivers the check for deposit in the payee's account at a bank. The depository bank indorses for its own account the checks it receives, and sorts and bundles the checks. The depository bank prepares a cash letter for each bundle of checks sorted, or a cash letter that accompanies a group of check bundles. A cash letter may accompany a single bundle of checks or more than one bundle of checks. A typical cash letter contains routing information, the number and total dollar amount of the checks in a particular bundle, and optional additional information. The cash letters and check bundles are then introduced into the payment system.

The traditional multiple steps in the processing and physically handling checks, and in the preparation and transmission of cash letters, result in the float of funds represented by the check. Float is the time cost of money following deposit of the check by the payee at the depository bank until actual payment of the funds is made by the payor bank from the check drawer's account and those funds become available for use by the payee. If the check is dishonored by the payor bank, the check is returned through the clearing system in reverse direction, directly or indirectly, from payor bank to depository bank in order for the depository bank to debit the payee's account for the dishonored check. The route of the dishonored check from payor to depository bank need not precisely retrace the route of the check from depository bank to payor bank, but may be a direct return from payor bank to depository bank, or may follow an indirect route. Dishonored checks are caused by insufficient funds in the drawer's account, a stop payment order in place for the particular check, or other reasons.

There are three payment related conditions for funds deposited in a payee's account at the depository bank. The first stage is a book credit of funds, denoting checks deposited by the check payee to its account at the depository bank, as noted on the books of the depository bank, but not necessarily available for use by the payee. The second stage is available funds, credited to the account of the payee at the depository bank and available for use or withdrawal by the payee. The time between book credit and availability of funds is determined by federal regulation, bank policy, and/or negotiated terms between the bank and its customers. The third stage is collected funds in which the deposited check has been honored by the payor bank and all risk of return or dishonor is eliminated. The most certain policy with regard to funds for a depository bank is to make funds available, or withdrawable, only when they have been collected. Reducing the time between the book credit and the collection of funds is advantageous to bank customers, to the banks and to the business community in general by making funds more quickly available for productive economic uses. Faster collection is an object of the present invention.

In the usual sequence of check handling, every transferee, in the sequential chain of the check transit from the check drawer to the payee and ultimately to the payor bank, the previous party from whom the check is received is responsible for collection and payment of the check. For example, the payee is responsible to the bank of first deposit, the bank of first deposit is responsible to the next bank, and so on. The time between book credit of a check and its collection (or dishonor) is reduced by the present invention. Reduced float is advantageous to the payee because it results in the expedition of collected funds into the payee's account.

Traditional banking practices may inherently delay the ability of the payee to withdraw funds represented by the check presented by a payee for collection until the depository bank makes certain that the funds have been collected at the payor bank from the drawer's account. Since the large majority of checks presented for payment are honored by the payor bank, banking practice does not send a notice honoring a check, only notice of dishonor. To insure against risk of loss to the depository bank by a payee withdrawing funds not subsequently collected from the drawer's account at the payor bank, banking practice requires a waiting period sufficient to insure that a dishonored check would be made known to the depository bank in time to reverse the depository bank's book credit of the funds to the payee's account and to deduct the uncollected funds from the amount of the book credit. Use by the payee of subsequently uncollected funds is, at best, an interest-free loan to the payee even when a solvent payee promptly redeposits the uncollected amount in its account at the depository bank. At worst, the entire amount of a check could be lost if the check is uncollectible. Recent banking regulations, such as Federal Reserve Regulation CC, mandate a shortened time during which a payee must wait for access to its deposited and credited funds. Thus, expedited procedures for processing and collecting checks reduce the risk of loss to a depository or subsequent collecting bank through dishonored checks. Expedited procedures also benefit the payee-depositor by permitting the depository bank more promptly to release funds for payee use, offering customers more effective cash management.

The receipt of 10,000 to 1,000,000 or more checks within a predetermined period drawn on numerous different banks is not unusual for large businesses such as credit card issuers, utilities, and mail order processors. In situations where large numbers of checks are involved, the handling of individual checks and effecting their posting, deposit and clearing is a complex multiple step process, additionally complicated for the recipient payees of such checks, because a payment stub, invoice, order form or the like is usually enclosed along with each payment check. The payee must open each envelope, and record, reconcile and separate the payment stub from the check, optionally send the payment stub for archival storage (such as on microfilm or electronic media) or destruction, and send the check to the payee's bank for deposit, collection and credit to the payee's account through the check payment system. Thus there exists a need for a system whereby the conventional deposit and collection of funds represented by a check or other financial instrument may be expedited and the internal processing thereof made more efficient, particularly for businesses that regularly receive large numbers of checks and other forms of payments from their customers. The invention eliminates repetitive processing steps and begins the check clearing process at the payee's point of receipt as an adjunct to the payee's internal accounting.

Lock box or other means of collection consolidation and acceleration known in the prior art do not achieve the efficiency of the present invention. Typical lock box services, offered by cash management divisions of commercial banks or other entities, commonly entail routing customer payment checks to the payee through a designated post office box. The payments are generally collected from a post office box by the bank or cash management service at predetermined time intervals (e.g., several times a day) and removed from envelopes. The payment stubs are routed to the payee for accounting while the accompanying checks, credited to the accounts associated with particular stubs, are routed within the depository bank to begin the customary collection process. While this procedure achieves an efficiency of scale by aggregating and more rapidly depositing customer checks to the account of the payee, payment stub processing by the payee, paper check processing by a lock box manager or bank, and the physical transportation of both between lock box location, payee and depository bank and their final, physical processing in the check payment system are still conducted conventionally, slowly and repetitively.

A variation of a lock box procedure is the Payment Consolidation Service offered by NBD, N.A. of Detroit, Mich. In this procedure, invoice payments by check and electronic payments through a bill payment service are both sent directly to a depository bank, while the bank transmits certain customer accounting information electronically to the payee, the system otherwise employs conventional bank processing procedures for the physical sorting and transport of checks in the check payment system and/or the processing of electronic payments.

The present invention is directed to the bank customers (payees) who maintain customer accounting functions internally. For such bank customers, the present invention permits the payee to adapt and coordinate internal bill payment, accounting, and check processing procedures with the procedures that introduce checks into the payment system for collection.

Stephens et. al., United States Letters Pat. No. 5,237,159, describes the preparation of various electronic files that mirror paper cash letters and detail records (checks). The present invention is directed not to specific forms of electronic formatting and arrangement of the check information for rapid electronic transmission, as is Stephens et. al. Rather, the present invention is directed to an integrated system involving predetermined processing steps. Beginning at the point of receipt, this system facilitates the check payee's internal accounting for checks it receives and expedites the flow of check and cash letter information through the check payment system as a bank of first deposit monitors the check payee's account at the bank with regard to the checks received. Any suitable means for electronic file arrangement and transmission is useful in the present system.

SUMMARY AND OBJECTS OF THE INVENTION

The present invention comprises an integrated system beginning at a payee's item capture facility for effecting the efficient submission of checks and other financial instruments into the payment system for collection of funds. The financial instruments are received by a payee at a capture location remote from the payee's collecting and clearing depository bank and are presented for payment through the check payment system to the multiple institutions on which the instruments are drawn. In one embodiment, electronic scanning means at a first location established by the payee receives the financial instruments, scans and extracts necessary data therefrom including the data of the magnetic ink character recognition (MICR) line of the instrument, adds necessary data such as the amount and a document identification number to the electronic information associated with each check, and sends this electronic information to the payee's depository bank for further electronic sorting and processing both with regard to the introduction of the checks into the payment system and the crediting of funds represented by the checks to the payee's account at the bank, as the payee processes the check in its own record of account with the check payor. In this first embodiment, the paper financial instruments are typically imaged (electronically, digitally, optically, on microfilm or disk, or otherwise) for archival storage at the payee's location remote from the payee's depository bank, substantially contemporaneous with the capture of the financial or other information on the instrument. The paper instrument itself may then be disposed of, eliminating the need for any additional mechanical sorting, indorsing or imprinting by either the payee or the payee's depository bank.

Another embodiment of the present invention sends the paper checks after processing at the point of receipt from the payee's location into the check clearing and collection system. Mechanical sorting of the paper checks is performed at a first (the payee's) location according to predetermined sort pattern categories specified by the payee's depository bank. Indorsements on behalf of the payee and the depository bank with respect to each instrument received are applied to each instrument. Other information such as the amount and/or a document identification number may also be imprinted on the instrument. In the sorting process, a mechanical sorter assembles the sorted instruments into discrete groups with respect to predetermined sort pattern categories and associates one or more cash letters with each assembled group of instruments according to categories determined by the payee's bank of first deposit. A communication link is established between the payee's location and the depository bank. Information pertaining to the checks and/or the cash letters in anticipation of a deposit in the payee's account corresponding to a cash letter (or cash letters) is transmitted from the payee to the collecting and clearing depository bank. A transport means, usually air or land, delivers the groups of sorted instruments and the one or more cash letters from the payee's location into the check payment system on behalf of the payee's depository bank.

A central processing unit and communication link determines the timing of check transport and information transmissions according to criteria specified by the depository bank, consistent with schedules appropriate to the check payment system, and monitors the transit of the sorted checks. The processing unit also coordinates information about the deposit of funds represented by the checks in the payee's account at the depository bank in a sequence coordinated with the timing of settlement in the check payment system according to a schedule determined by the depository bank.

It is an object of the present invention to provide an expedited funds deposit and collection mechanism for checks and other financial instruments received by a payee.

A further object of the present invention is to reduce costs of collection and deposit of paper instruments on behalf of the payee and payee's depository bank.

Another object of this invention is to reduce the complexities and requirements for physical transport of financial instruments where paper checks and financial instruments are involved and to reduce the physical transport per se of checks in the collection process.

It is a further object of the present invention to eliminate duplicative data capture steps and multiple handling involved in the payee's and the bank of first deposit's handling of the same payment and to coordinate the payee's internal invoice accounting system with the submission of checks received by the payee in the payee's system resulting in efficiencies in account processing and in funds collection.

Other objects of this invention include the elimination of duplicative steps of physical processing of checks and financial instruments and payment stubs which accompany them, the reduction of errors, adjustments, rejects, balancing time, item handling and personnel costs.

These and further objects of the invention will be more readily understood with reference to the following description of the preferred embodiment taken in conjunction with the figures.

DESCRIPTION OF THE PREFERRED EMBODIMENT

The present invention is a system for processing checks and other financial instruments. A check payee, as an agent of the depository bank processes the checks at their point of receipt as an adjunct of the payee's internal invoice accounting system. The payee performs according to criteria and procedures mandated by the payee's depository bank, at a location remote from the bank's conventional collection and deposit processing facilities. The processes of the present invention expedite the processing of checks by the payee and the payee's depository bank; the submission of the checks for payment into the payment system; and the deposit and availability of funds represented by the checks into a depositor's account.

EXAMPLE I

Example I is an embodiment in which physical paper checks are not transported from the payee's location. Appropriate information from the checks is extracted and converted into electronic form for sorting, processing and transmission into and through the payment system. The physical checks are disposed of, typically following imaging and archival storage by electronic, optical, microfilm or other means at the payee's location (or other location remote from the depository bank). This embodiment truncates checks at the payee's point of receipt.

Figure 1:
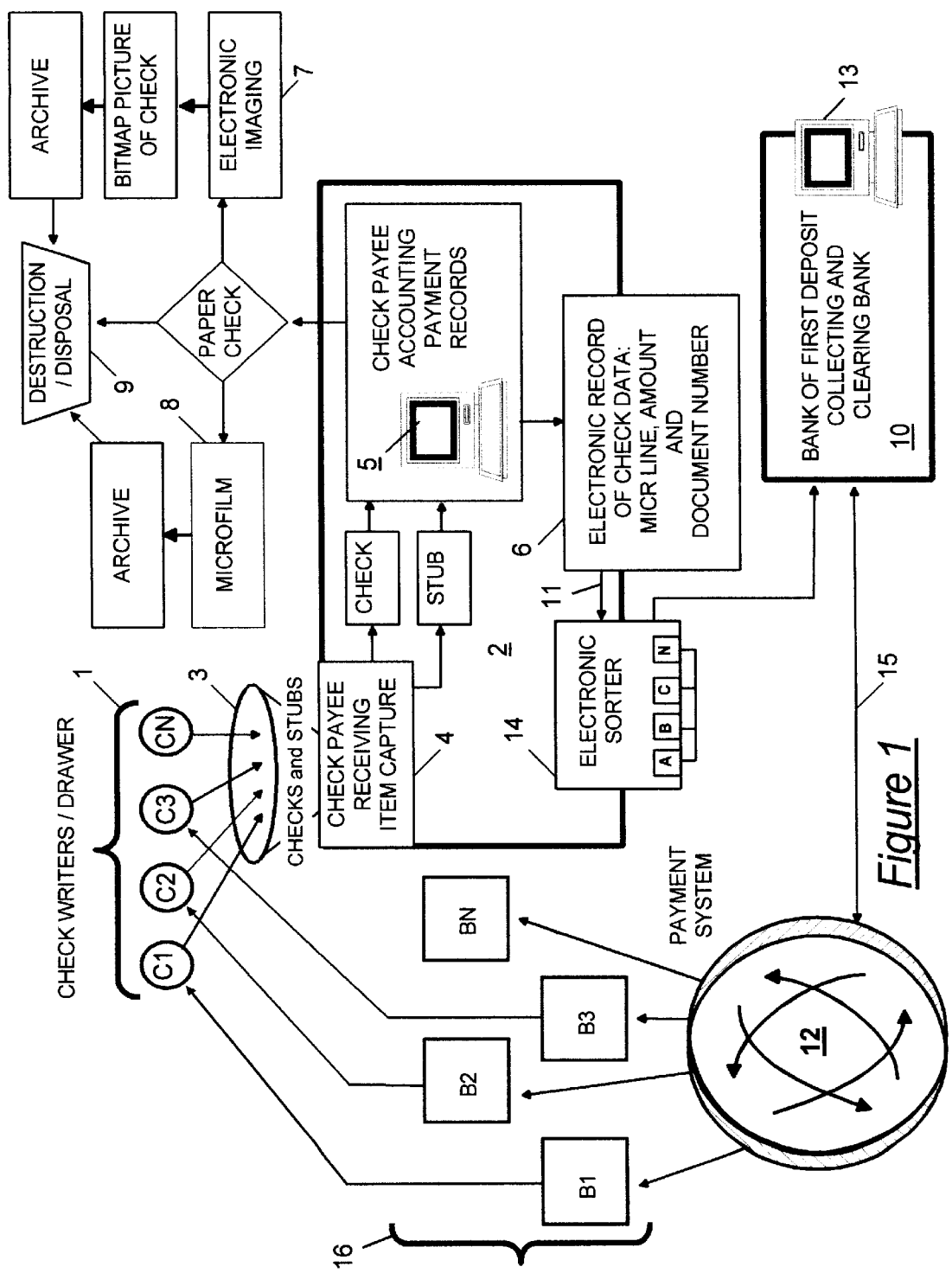
FIG. 1 is a flow chart depicting the processing of checks, and the electronic transfer of information derived therefrom, from the payee to the depository bank and into the check payment system resulting in the ultimate collection of funds from the account of the check writer, as such activities are coordinated by processing means at locations of the check payee and the depository bank. Paper checks are not delivered into the payment system by the payee or depository bank in this embodiment.

With reference to FIG. 1, the check payee and bank customer 2 is a public utility such as a telephone company, or other business entity receiving a large number of periodic payments from numerous customers. In FIG. 1, the drawers of the check or other financial instrument (the customers of the payee) are denoted by $C_1, C_2, C_3, \ldots C_n$, collectively denoted by 1 in FIG. 1. The check drawers (payors) are paying invoices received from the payee and the checks are usually accompanied by a payment stub, invoice containing information about the payee's account, or an order form or the like containing relevant information about the identity of the payor and the purpose of the payment. For the typical case in which the check payee (and bank customer) 2 is a utility, credit card company or other large commercial enterprise, there may be many thousands or millions of customers 1, submitting payments to payee 2, often periodically and typically monthly. The method of payment and delivery of payment to the payee, denoted by 3 in FIG. 1, is typically via the mail. In-person delivery, commercial messenger, and other forms of delivery of checks to payee 2, are also utilized by some customers.

In the present invention, the check payee 2 typically receives these check payments and associated statements through a functional component of the receiving organization known as remittance processing in retail organizations, or deposit processing when received by a bank. Item capture 4 in FIG. 1 represents these functions. Item capture 4 will typically occur at a location convenient to the payee's accounting functions 5. Check receiving and item capture functions may be located at strategic bill collection points within the payee's service region. Most typically, the check receiving and item capture function of the payee will compare a payment stub with the enclosed check and send the check on for further processing. The payment stub commonly received along with the check is processed further by the payee and the funds represented by the check are reconciled with the check drawer/payor's account. The stub may be stored in archival storage as paper, microfilm, etc., or otherwise used to account properly for the customer's payment. Payment stub processing and internal accounting procedures for the reporting and allocation of payments, are an adjunct of the funds collection system of the invention herein.

FIG. 1 relates to an embodiment of the present invention in which paper checks or similar instruments are not forwarded by the payee for processing through the depository bank or payment system. Because physical transport of checks is not required, mechanical sorting of the paper checks received is not necessary. The embodiment of FIG. 1 uses electronic transmission of information related to electronically sorted information about checks received and electronic cash letters related to the particular groups of sorted checks. Therefore, sorting, reconciliation, etc., is effected by electronic means without the need for mechanical processing or delivery of physical paper checks.

Following receipt and item capture by the payee, the check will advance to scanning and processing in the electronic scanning block 6 of FIG. 1. In this step, the check is scanned by a suitable reader. (This processing step may also include verification of the data collected electronically by human operator comparison of the electronic data with the physical check and the payment stub.) The data thus collected will typically include the MICR (Magnetic Ink Character Recognition) data from the MICR lines of the checks. The amount of the check and a date will also be collected (optionally verified by a human operator) and included with the electronic record to be associated with each check. In the typical practice of the invention, electronic indorsements on behalf of the payee and the depository bank will be applied to the electronic record of the check; and a document identification number will also be generated and added to the electronic record of the check to aid in subsequent location and retrieval of the information concerning the particular check. This information typically collected from the MICR line and the check amount is referred to as bank information. The payment stub information comprises the information necessary to the payee derived from the payment stub to reconcile the payment with the check payor's account with the payee.

Because this embodiment does not forward paper checks into the payment system, there is no need for the check amount to be added to the MICR line of the physical check as is a common procedure in current check processing operations. Amount imprinting is not necessary in this embodiment of the present invention.

FIG. 1 also shows the accounting function of the check payee 5 following the electronic scanning of the data from the check 6. Payee accounting 5 may also include the processing of payment stubs directly from the payee receiving item capture function 4 in place of, or in addition to, the processing of information from the check. The information flow within the check payee's organization from item capture 4 to the check payee accounting function 5 is a matter of payee preference.

In FIG. 1, box 7 indicates the creation of an image of the check for archival storage 8 prior to possible disposition of the paper instrument 9. An image of the physical check is created. This image is preserved and may be reproduced as a copy of the check for purposes of signature comparison, amount verification, etc. if needed. The image may be an optical or electronic gray-scale or color image of the check maintained in archival storage in pixel-by-pixel digital, optical, magnetic, electronic, fully optical or other storage technology from which information can be derived. Alternative storage mechanisms include microfilm, video tape, laser disc or other tape or direct image storage technology. This functional block 8 of FIG. 1 is not limited to any particular technical embodiment; a form of image of the actual physical check is stored, capable of later retrieval, from which detailed information related to the check and its visual appearance may be displayed. Following the storage of the check, disposal of the paper instrument 9 may occur.

Disposal of the physical paper check (by destruction, recycling, etc.) at the location of the payee 9 occurs in one embodiment of the present invention. Terminating the transport of the physical paper check at a point in the collection and clearing process before return to the check writer is termed truncation of the check at that point beyond which the check is not physically sent, whether the check is physically destroyed or placed into archival storage. In practice, the physical checks may not be destroyed, but may be placed in warehouse storage for a period determined by banking policies. Disposal 9 of the paper checks may involve either the physical destruction of the instrument or archival storage of the paper check in addition to imaging 7 of the check and the storage 8 of the image in a space-efficient form.

Other truncations are consistent with the present invention resulting in more effective check collecting processes for both the payee and the depository bank. Truncation at the point of sale is an embodiment in which the MICR line, and check amount (and optional additional information) is extracted from the check for electronic transmission. For retail establishments such as grocery chains and the like that receive large numbers of point of sale checks, the present invention is applicable with the item capture location of the payee being the point of sale check receiving establishment. Point of sale capture may, but need not necessarily, include imaging of the check.

Other truncation schemes are possible in which the physical paper check is sent beyond the payee to the depository bank, or to the payor bank, or elsewhere in the check collection system.

Figure 2:
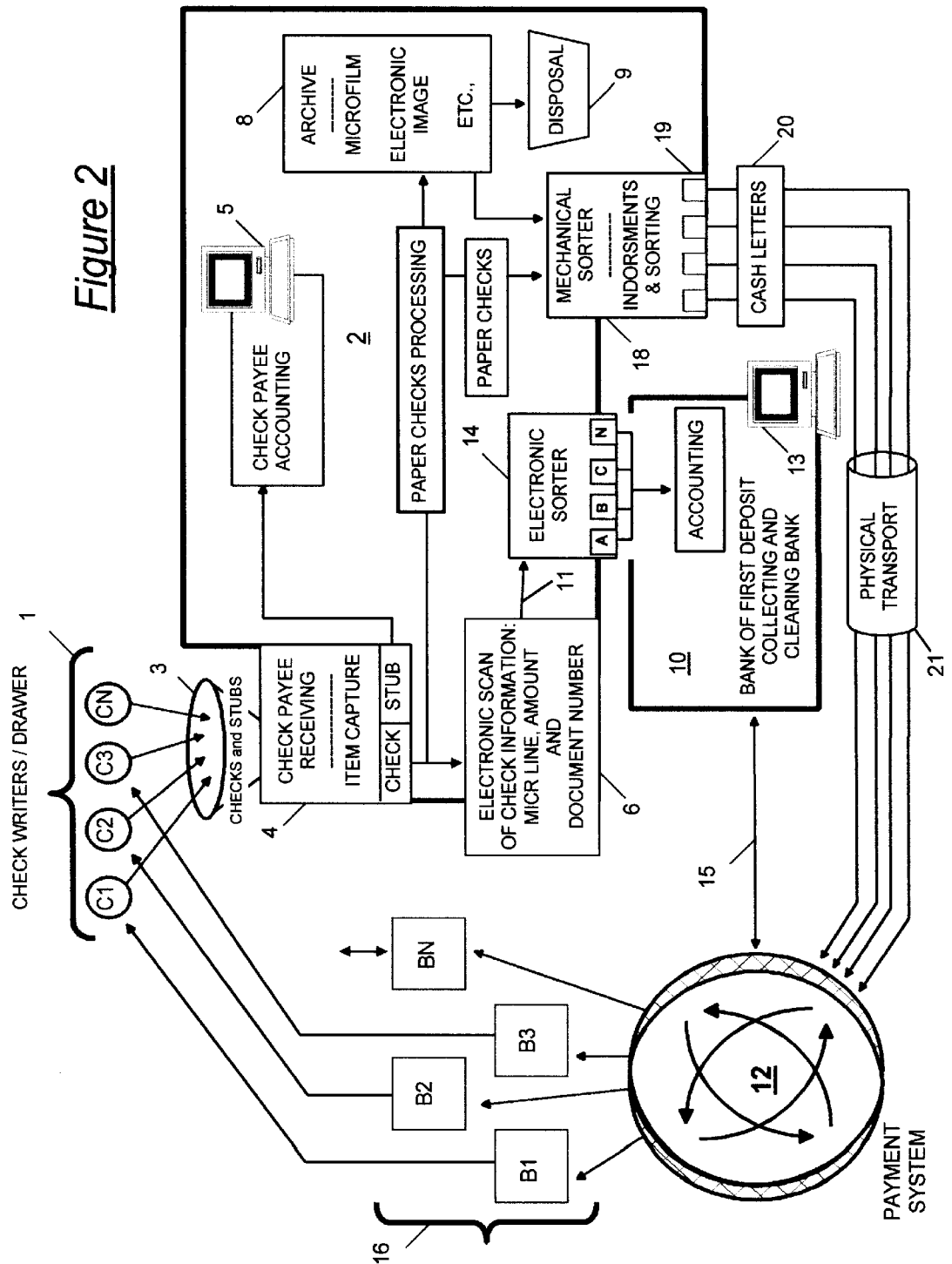
FIG. 2 depicts an embodiment in which paper checks are delivered from the payee into the payment system.

The image function 7 is depicted in FIG. 1 separately from the electronic scanning function 6 for clarity in graphical depiction. The electronic scanning for extraction of the data from the MICR line, etc.,may be combined with the imaging of the check to reduce check stacking, feeding, positioning and other mechanical manipulation steps for the proper items. Whether scanning 6 and imaging 7, in FIGS. 1 and 2, are combined in one piece of equipment, or more than one, is a matter of convenience.

In FIG. 1, the image 7 is stored at the payee's location in an archival storage facility 8. However, this image of the check may also be transmitted electronically to the bank along with the other information extracted from the check. The amount of information in the image is typically greater than the transactional information extracted from the MICR line and is added to the electronic record of the check. Thus, transmission of the image requires greater communication capacity than transmission of the transactional check data alone.

The information from the electronic scanning 6 performed at the payee's location is transmitted via a suitable communication link 11 to the depository bank 10. At the depository bank, the appropriate adjustments of the payee's account balances by the depository bank are carried out 13. The payee's account is credited with the appropriate amounts as such are compiled by the payee and the information thereof is received electronically from the payee. The electronic check information is sorted and routed via 14, with appropriate electronic information added thereto to insure proper routing through the payment and clearing system to the appropriate payor bank. Electronic information of the sorted checks transmitted for particular payor banks, the equivalent of a cash letter, is included with each electronic bundle of checks.

The electronic check information as sorted, grouped and annotated 14 by the depository bank is sent via an appropriate communication link 15 into the payment system 12. The payment system 12 includes clearing institutions such as the Federal Reserve Banks, correspondent banks, The National Clearinghouse Association (described in United States Letters Pat. No. 5,265,007), the electronic check clearing house organization (described in Stephens et al., supra), and like mechanisms. Having a direct relationship to the check payment system, the collecting and clearing depository bank 10 is considered a part of the check payment system.

The payment system 12 receives checks from depository bank 10 and other banks of first and subsequent deposit (not depicted on FIG. 1) intended for various payor banks, $B_1$, $B_2$, $B_3$ . . . $B_n$, collectively denoted as 16 in FIG. 1. The check information from the payment system 12 reaches the appropriate payor banks 16 for proper debiting of the accounts of check writers 1 thus completing the payment cycle. In the event of dishonor of a check by a payor bank, the process reverses as to the collection of the dishonored check, and this information may be transmitted electronically back through payment system 12 (or by more direct means of reversal) to depository bank 10 for unwinding the transaction and for debiting of the payee's account as to the dishonored check.

Modifications of the system of FIG. 1 are apparent to those with skill in the art. For example, electronic sorting, routing, grouping and preparation of electronic cash letters may be merged completely at the payee's location 6 with the depository bank's function 14 comprising the extracting of cash letter information as the electronic transmission passes through communication links 11 and 15. The electronic information thus extracted by the depository bank would enable the updating of the depository bank's account balances for the payee. Checks written by check writers $C_1$ . . . who are also customers of the depository bank 10 would be cleared and appropriate fund transfers made immediately at the depository bank. Conversely, minimal processing may be performed at the payee's location and the steps of item capture, scanning, imaging, sorting, and depositing into the payment system could be performed at a different location.

The image 7 is transferred via a communication link 11 from payee 2 to depository bank 10 for financial information processing and archival storage. This embodiment may be particularly suitable when the payee is a retail establishment receiving numerous point of sale checks but lacking internal accounting facilities.

The timing of transmissions between payee 2, depository bank 10, and the payment system 12, typically occurs according to predetermined schedules established by the bank, the payee customer of the bank and/or the payment system itself. Communications between payee 2, depository bank 10, and the payment system 12 will be under the control of a central control/processor unit 17 according to criteria established by the depository bank. This control unit coordinates, synchronizes, times and avoids interference in and among the various communications involving the depository bank and the payee and insures compliance with schedules necessary for the check payment system.

FIGS. 1 and 2 show a single control unit 17 at the location of the depository bank 10. Alternatively, it may be convenient to have the control function at the payee's location 2 or to split the control function between processors located at the payee's location, the depository bank's location or elsewhere, provided, however, that the bank determines the control, coordination and transmission protocols and the submission and collection of funds over the payment system 12.

The present invention depicted in FIG. 1 is contrasted with the traditional check payment and processing procedures in which funds represented by checks received for payment of an amount are matched with the customer's invoice or account internally and the physical paper checks are indorsed and physically transported to the depository bank for deposit in the payee's account. Conventionally, the depository bank repeats the reading, sorting, indorsing and packaging the physical checks for submission into the payment system according to the depository bank's preferred sort pattern categories. Cash letters are then prepared by the depository bank, associated with the bundles of sorted checks and together they are introduced into the payment system to complete the processing. The invention depicted in FIG. 1 does not require physical sorting, bundling or indorsing of the paper checks or transportation of the physical checks from the payee to the depository bank. Only a single mechanical processing of the physical checks during the scanning operation 6 at the payee's location is required.

EXAMPLE II

In the example depicted in FIG. 2, electronic transfer and processing of payments occur and paper checks follow at some later time for confirmation, reconciliation and storage by the payor bank and/or for return to the drawer. Paper checks in this system are truncated at a point beyond the bank of first deposit, usually at the payor bank, where the checks are stored or imaged for archival storage and optionally disposed.

In the example of FIG. 2, checks or other paper financial instruments are received by payee 2 from numerous check writers 1 via the mail or other delivery means 3 as described in connection with Example I. The checks are received at item capture site 4, scanned 6, accounted for 5, and imaged 7, in a manner explained with respect to Example 1. Because the physical paper checks are preserved, imaging and/or storage of the images are not necessary unless the image is transmitted along with other bank information and used for long term archival storage.

The processing steps, and modifications thereto, are essentially unchanged in Example 2 when compared with the all-electronic processing of Example 1. Electronic information scanned from the check at 6, is transmitted via communication link 11 to depository bank 10 for sorting, processing, and bundling 14. This information is entered in the payee's account 13. The bundled electronic check information and accompanying electronic cash letter information are forwarded into the payment system 12 via communication link 15 under the bank's control through processor 17, all essentially as described in connection with Example 1.

The embodiment of Example I, however, is one in which the physical paper check is presented through the payment system 12 for delivery to one of the payor banks 16 (or otherwise truncated at some point within the payment system beyond the check payee). The paper check follows the electronic information previously transmitted via 15 into the payment system 12. Thus, this embodiment is a paper-to-follow system providing rapid processing of the essential financial and accounting information represented by electronic records of the checks. The physical checks follow thereafter. The paper check in this embodiment is processed by indorsing, sorting, bundling, routing, and the generation of a physical cash letter to accompany the physical bundle (or bundles) of checks through the payment system. Indorsements to checks on behalf of the payee and the bank of first deposit are applied to the check by a payee at the payee's location.

In FIG. 2, the paper checks are shown to be sorted by sorter 18 in sort pattern categories determined by depository bank 10. The depository bank may require sorting according to pattern categories of check volume in a predetermined geographic area, the financial institution(s) on which the checks were drawn, the geographic or commercial area of a bank that will otherwise accept a check for clearing and collection, or other sort pattern categories. The various categories into which the checks are thus sorted are denoted schematically by pockets 19 in the sorter of FIG. 2. In this embodiment, processing 18 will typically include indorsing the checks, both for the payee and for the depository bank at the payee's location. An institutional indorsement is conventionally applied as a payment instruction and includes the identity of the indorser on the reverse side of a check.

The mechanical processing of checks at payee's location 18 will also include the generation of physical cash letters 20 to accompany the bundles of sorted checks into the payment system 12. The bundles of checks with accompanying cash letters are physically transported into the payment system by means of any conventional, customary or useful transport means 21 for processing by the payment system 12 according to conventional procedures.

Here, the electronic processing of the funds represented by the checks precedes, and typically does not wait for, the arrival and processing of the physical paper checks. Thus, the information relating to the potential availability of drawer funds in the payor bank 16 is expeditiously made known through the payment system electronically to the depository bank 10. The paper checks follow directly from the payee, on behalf of the depository bank, directly into the payment system, also in an expedited manner according to the present invention, since separate sorting and indorsing by the payee and the depository bank are combined into a single sorting and indorsing function 18 at the payee's item capture facility. The separate transport of paper checks to depository bank 10 is unnecessary. The timing of steps is synchronized and coordinated with respect to (a) the check payee 2 and the bank of first deposit 10 via communication link 11, (b) the check payment system 12 with respect to the indorsing and sorting of checks 18 and 19, (c) the transmission of check MICR information via communication link 15 and the submission of doubly indorsed checks into the payment system 12 via physical transportation 21, and (d) the payment of funds represented by the checks (or the dishonor of a check) by payor banks 16. Coordination under the direct control of the depository bank, according to criteria established by the bank, insures availability to the payee of deposited funds in compliance with federal regulations, depository bank policy, and/or contractual agreement between the payee and the depository bank.

In the prior art, once the check payee 2 processed and indorsed the payment checks received to reconcile its own and its customer's accounts, the payee would physically transport the indorsed checks to its depository bank 10 where the payee maintains an account and the checks would be deposited to the credit of the payee's account. The depository bank, being the bank of first deposit, would separately indorse the checks on its own behalf and submit the checks into the check payment system resulting in the ultimate payment of funds represented by the checks from the check writer's account at payor banks (or the dishonor of the check). In that process, the bank of first deposit would apply its own indorsement to the checks already indorsed by the payee and would physically sort the checks and prepare any accompanying cash letter for delivery into the check payment system where settlements with other financial institutions on which the checks were drawn would be effected. Such a settlement involves the physical transport and exchange of the checks, and a calculation of aggregate amounts owing and payable by participants in either a bi-lateral or multilateral settlement at a predetermined time. After settlement, the payor bank would physically have custody of the check and would conventionally process the check for its customer's account.

In contrast, the present system provides that the check payee 2 in its own processing of the checks, at a site distant from the location of the depository bank 10, indorses the check for payment both on its own behalf and on behalf of the bank of first deposit where the check payee 2 maintains an account and deposits the funds represented by the check. In its processing of the checks, the payee will typically add the check amount to the MICR line and date information about the check. The indorsed checks are sorted by the check payee in accordance with predetermined sort pattern categories 19 selected by the depository bank and the payee prepares a cash letter 20 in the name of the depository bank for each group or bundle of checks within the predetermined sort category.

The particular order of operations shown in FIG. 2 is not intended to exclude other equivalent sequences. For example, the electronic scanning of the checks 6 may be performed by the same physical equipment at substantially the same time as the mechanical sorting and indorsing 18 and 19, and the preparation of cash letters 20. Other modifications will be obvious to those of skill in the art.

Improvements in efficiency and time, and a reduction in paper handling is achieved by the system of the present invention as compared with the repetitive instances of physical handling, multiple transportation, and duplicative sorting indorsement encountered in the prior art. Delivery of physical items to the bank of first deposit is eliminated. Two indorsements of the check are applied at the same time, instead of twice at the different locations of the payee and the bank of first deposit. The payee/customer applies the bank endorsement on behalf of the bank. The faster collection of funds, to the benefit of the payee and the bank in the check collecting and clearing sequence is achieved.

Thus, the system accelerates the check collection process by eliminating the need for, and the time consumed by, the physical transport of checks to the depository bank and the subsequent physical transport of the checks and submission of checks into the check payment system by the depository or the collecting and clearing bank. Separate sorting and capture of information by both the payee and a bank of first deposit is eliminated. The inter-relationship of the depository bank, or the collecting and clearing bank, with the sorter and indorsement applier is effected by electronic communications and a control system of processing computers at one or each of the bank and the payee. The cash letters for the sorted checks on behalf of the collecting and clearing bank are prepared at the remote customer/payee's location. Physical items that formerly required double handling, first by the customer/depositor and then by the collecting and clearing bank are now singly handled at the point of receipt at an item capture facility where the beginning of the check clearing process also includes the introduction of the check and payment stub information into the customer/payee's own account records. Not only is the collection of funds expedited, but because the system is integrated at the payee site with the payee's own internal accounting system, added efficiencies to the overall process of bill payment and funds collection are achieved both by the payee and the bank of first deposit.

As handling is reduced, redundancy is eliminated, cost is reduced and errors caused by duplication and the transfer and handling of numerous checks are also reduced. The checks are forwarded according to predetermined sort pattern categories into the check payment system as established by the collecting and clearing bank. Hence, with reference to Example I and a local utility as an assumed payee, most of the checks received by the utility would likely be drawn on banks in the utility service area, and the clearing of the checks would be effected through the local check payment system. The collecting and clearing bank, if in a location other than that of the utility, maintains an electronic link for settlement purposes for participation in that local check payment system.

The payees in Example I and in Example II may also establish and maintain an archive on behalf of the depository bank for the received checks, as well as for itself, whereby each check received by the payee is imaged and assigned a unique document identification number for retrieval purposes.

Thus, the invention provides a system for effecting the deposit of checks and the collection of funds represented by checks that are received by a payee at a location remote from the payee's depository bank and presented for payment to multiple institutions in the check payment system.

A communication link between the payee and the depository bank enables the payee to report to the bank the information about the checks and cash letters and permits the bank, upon receipt of the information, to anticipate in the bank a deposit in the payee's account. Typically, when the bank receives confirmation that it has received credit for the cash letter through the check payment system, it makes the funds available to the payee, although other contractual arrangements between particular payees and its depository bank may be negotiated.

The timing of communications and the scheduling and confirmation of check processing activities are coordinated by a central processing unit and communication link between/among the parties involved in the check payment process. In this manner the timing of the physical transport of the instruments for submission into the check payment system is controlled by the depository bank and the delivery by the payee of the sorted checks into the check payment system is confirmed and verified to the bank by the payee and through the bank's link into the check payment system. The recording of the check deposit as withdrawable funds in the payee's account with the depository bank is thus coordinated with the timing of the issue of a credit to the bank when the checks are cleared through the check payment system and the bank's account in the payment system is credited with funds received. The transport of bundled instruments and the associated cash letters from the payee's item capture facility location to a payment system receiving point is effected by conventional ground or air delivery.

In certain circumstances, it is desirable to verify the cash letter or bank information at one or more stages. For example, the image of the check produced as 7 in FIG. 1 and FIG. 2 may be verified, electronically or manually, with the check-by-check bank information extracted electronically 6. In another embodiment, the electronic cash letters generated at 14 or 6 are compared with the electronic bank information at more than one location, by more than one piece of equipment, and/or by more than one human operator. Verification of physical cash letters 20 against electronic bank information and/or the images of the checks themselves is also an adaptation of the present invention. When images are transmitted through the communications links 11 and 15, it becomes easier for multiple verifications to be made comparing the bank information and cash letters with each other and with the check image itself. Although data encryption is employed as a security measure in electronic funds transfer (and presumed herein), additional data checks and verification at several points along the transmission system enhance security. Redundant parallel communications links, with a different encryption procedure for each, allow the comparison and verification of the bank information at both ends of the parallel, encrypted transmissions.

Given the foregoing disclosure, it is evident that the benefits of the system described herein may be extended to numerous types of commercial activities in which a volume of checks is received. The examples described a utility as a payee. The benefits of the present invention will be most apparent to bank customers that receive a large number of periodic check payments from numerous of their own customers. Individual banks themselves may establish a relationship with a bank using the present invention. In this case, the depository bank 10 in FIG. 1 and FIG. 2 would be a bank of second (or later) deposit, receiving electronic information, and/or checks from another bank as its customer 2. The depository bank 10 would be an outsource processor for the other bank. There is no essential change in the present invention whether the bank customer 2 is a commercial entity or itself a depository bank for commercial entities.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather it is intended that the scope of the invention be determined by the appended claims.

What is claimed is:

1. A mechanism for effecting the deposit and submission into a payment system of financial instruments for the collection of finds represented by financial instruments, containing financial information about a payment, the financial instruments being drawn on different payor institutions and received, accompanied by a payment stub identifier, by a payee at a location convenient to a payee's item capture facility and remote from the payee's depository bank, comprising the interconnected:

a) scanner at the location for scanning each financial instrument and deriving financial information from each of said instruments and converting said information into a first information record as to each said instrument;
 b) means for associating said financial information with the payee's records of accounts based upon information derived from the payment stub accompanying the instrument for further processing by the payee;
 c) imager for creating a second record translatable into a visually perceptible image of each of said financial instruments;
 d) an archive for storing said records;
 e) first communication link between said location and said payee's depository bank for transmitting said financial information from said location to said depository bank; for transmitting process control instructions from said depository bank to said location; and for communicating verification of transmission and receipt of information and instructions between the location and the bank;
 f) processor for adding document identifiers and routing information to the first information record of each instrument to create a unique record thereof;
 g) sorter for separating said unique records into predetermined categories determined by the depository bank and for assembling bundles of said unique records into the categories and associating said bundles with electronic cash letter information;
 h) second communication link between one or both of said location and the depository bank and the payment system for transmitting said bundled records accompanied by their respective cash letters into said payment system for ultimate payment by the payor institution for each of said instruments; and,
 i) controller for controlling and coordinating transmissions between said first location, said depository bank and said payment system in accordance with predetermined criteria established by the bank.

2. The system of claim 1 including means for adding to the record of each instrument an indorsement indicia on behalf of each of payee and the bank.

3. The system of claim 2 wherein said financial information comprises the information from a MICR line on said check, the amount of said check, and a document identification number.

4. A system as in claim 1 wherein said imager at said location creates an electronic image of each of said financial instruments for transmission of said electronic image over said first communication link to said depository bank.

5. A system for effecting the submission of financial instruments into a payment system for the collection of funds represented by the instruments and for crediting the instruments payee's account at a depository bank with the funds represented by the instruments, the instruments being drawn on different institutions and received by a payee with a payment form at an item capture facility remote from the depository bank where the payee maintains an account, comprising:

a) a scanner at the item capture facility for scanning information from said instruments and converting said information into a transmittable representation thereof;
 b) means for associating said information with the payee's records of accounts corresponding to the payment form;
 c) means at said facility for applying to each of said instruments a separate indorsement on behalf of each of said payee and said depository bank;
 d) a sorter at said facility for sorting said financial instruments according to predetermined sort pattern categories determined by the depository bank for assembling sorted instruments with endorsements thereon into bundled groups with respect to the predetermined sort pattern categories;
 e) a means at said facility for preparing at least one cash letter for association with each bundled group of instruments;
 f) means for assembling information scanned from the instruments into a transmittable record with respect to each instrument in a correspondence with the bundled groups and cash letters for communication to the bank;
 g) transport means for delivering said bundled groups of sorted instruments with associated cash letters from the facility into said payment system;
 h) a communication link among said facility, the depository bank and the payment system for transmitting information concerning said instruments, the bundled groups and cash letters;
 i) a controller for coordinating the transmissions of information among the capture facility, the depository bank and the payment system and for coordinating the delivery of the instruments and cash letters into the payment system according to criteria determined by the depository bank and for crediting the payee's account at the bank with regard to said instruments.

6. The system of claim 5 wherein said financial instruments comprise checks having MICR lines.

7. The system of claim 6 wherein said information comprises information from said MICR line and the amount of said check, and a document identification number is applied to said check and the transmittable record thereof.

8. The system of claim 5 wherein a printer applies information representing the amount of the check to the MICR line of each of said checks.

9. The system of claim 5 including an imager at the facility for creating an image of each of said financial instruments, a storage archive for maintaining such images, and means for delivering the images from the facility to the archive.

10. The system of claim 5 further comprising means at said first location for preparing said at least one cash letter in an electronic form and in a printed form.

11. A process for coordinating the receipt of a multiplicity of payments by check, the check being accompanied by a payment form associated with the check and for effecting the recording of a deposit of the check at a depository bank and for submitting the check into a payment system for the collection of funds represented by the check, the check being drawn on different institutions, comprising:

a) providing an item capture facility at a first location convenient to the payee for receiving said check and payment form associated with the check;
 b) scanning said received check at said first location, and extracting bank information therefrom, and converting said bank information into a transmittable record thereof;
 c) associating payee identification and payment account information derived from said payment form with information scanned from said check and processing said payment account information in the payee's internal accounting system;

d) imaging said check at said first location and creating a storable image of each of said check;

e) storing said images of said check;

f) disposing of said check;

g) electronically transmitting said bank information with regard to each check in the form of the transmittable record thereof from said capture facility to the depository bank;

h) sorting the records about each check according to predetermined criteria established by the depository bank; bundling groups of sorted records and adding electronic cash letter information to said bundled groups of records;

i) delivering the records of said bundles and cash letters into the check payment system for clearing at the payor bank on which each of said checks is drawn;

j) coordinating the delivery of the records of the bundles and cash letters into the payment system with the recording of the check as a deposit in the check payee's account at the depository bank; and k) controlling the transmissions and delivery of information between the capture facility, the depository bank and the payment system according to a predetermine schedule established by the bank.

12. The process of claim 11 wherein the scanning of information comprises scanning the MICR line of the check and the process further includes associating the amount of the check and a document identification number with the MICR line information.

13. The process of claim 11 wherein the imaging of the checks is in one of an electronically or optically readable format.

14. The process of claim 13 further comprising transmitting said images of the checks to the depository bank.

15. A process for introducing financial instruments into a payment system for the collection of funds represented by the instruments, the instruments being drawn on different institutions and received by a payee at an item capture facility convenient to a payee and remote from said payee's depository bank, the financial instruments representing payments to the payee accompanied by a payment form associating a payment with an account of the check drawer with the check payee, comprising:

a) scanning said financial instruments at said facility and extracting MICR and payment amount information therefrom, and converting said information into a transmittable representation thereof;

b) associating payment account information from the instrument with an account of the check drawer maintained by the payee;

c) imaging said financial instruments at said facility and creating a retrievable stored image of each of said instruments;

d) disposing of said instruments;

e) transmitting the information scanned from said instruments from said facility to said depository bank;

f) adding a document identifier associating the scanned information derived from each instrument to the record thereof and adding payment system routing information to said record;

g) sorting at least one of the scanned information and payment system routing information associated with the instruments into predetermined categories; assembling the information about a group of instruments in a same category; and preparing a bundled assembly of such information into an electronic cash letter;

h) maintaining a record between the item capture facility and the depository bank of the instruments received at said facility and the information about said instruments transmitted and recording the information about said instruments with regard to the payee's account at the bank;

i) communicating the electronic cash letter and information about the bundled groups of records of instruments into the payment system for clearing each of said instruments; and, j) coordinating transmissions among the facility, the depository bank and the payment system in accordance with a schedule determined by the bank.

16. A process for coordinating the receipt of financial instruments at a payee's item capture facility with payee's processing of the instruments and the collection of finds represented by the instruments through a payment system with the recordation of the deposit of such instruments in an account maintained by the instruments payee at the payee's bank of first deposit comprising;

a) associating the instrument received with a record of account of the drawer of the instrument with the payee;

b) extracting payment system information from the instrument and converting said information into a transmittable record thereof;

c) sorting the instruments at said facility according to predetermined sort pattern categories determined by the bank in accordance with destination points associated with the payment system and transmitting the payment system information about said records to the bank;

d) indorsing at said facility each of said instruments with separate indorsement on behalf of each of said payee and said bank;

e) sorting the instruments bearing said endorsements with respect to said predetermined sort pattern categories and assembling the sorted instruments into one or more bundles associated with each category;

f) preparing at said facility at least one cash letter associated with the one or more bundles of sorted instruments and delivering the one or more cash letters and associated one or more bundles into the payment system;

g) confirming the delivery of the at-least-one-cash letter and bundle into the payment system to the bank and reconciling said delivery into the information about said records transmitted to the bank; and, h) monitoring the clearing of said instruments in the payment system such that funds collected represented by the check are credited as received to the payee's account at the bank upon collection.

17. The process of claim 16 wherein said financial instruments comprise checks and the payment system information comprises the MICR lines on the checks and the process further includes adding the amount of the check to the MICR line of the check before the checks are delivered into the payment system.

18. The process of claim 16 in which the physical delivery of the checks in the process of clearing the check through the payment system is truncated.

* * * * *

UNITED STATES PATENT AND TRADEMARK OFFICE
CERTIFICATE OF CORRECTION

| | |
|---|---|
| PATENT NO. | : 5,930,778 |
| APPLICATION NO. | : 08/680218 |
| DATED | : July 27, 1999 |
| INVENTOR(S) | : Terry L. Geer |

It is certified that error appears in the above-identified patent and that said Letters Patent is hereby corrected as shown below:

On the Title page item 56 of the patent, under the section "Reference Cited," insert the following:

--OTHER PUBLICATIONS

Payment Consolidation Service, Glen P. Sgambati, Cash Management Dept. NBD Bank, N.A. of Detroit, Michigan--.

At column 10, line 13, delete "17" before "according."

At column 10, line 19, delete "show" and insert --include-- therefor, and please delete "17" before "at the location."

At column 10, line 63, after "7" insert --(not shown in Figure 2)--.

At column 11, line 10, delete "17" after "processor."

At column 12, line 19, delete the extra space after "account".

At column 15, line 1, delete "finds" and insert --funds-- therefor.

At column 15, line 42, delete "first" before "location."

At column 17, line 67, delete "svstem" and insert --system-- therefor.

At column 18, line 20, delete "finds" and insert --funds-- therefor.

At column 18, line 23, delete "instruments" and insert --instruments'-- therefor.

UNITED STATES PATENT AND TRADEMARK OFFICE
CERTIFICATE OF CORRECTION

PATENT NO. : 5,930,778
APPLICATION NO. : 08/680218
DATED : July 27, 1999
INVENTOR(S) : Terry L. Geer It is certified that error appears in the above-identified patent and that said Letters Patent is hereby corrected as shown below:

At column 18, line 24, delete "comprising;" and insert --comprising:-- therefor.

Signed and Sealed this

Twenty-ninth Day of May, 2007

JON W. DUDAS
*Director of the United States Patent and Trademark Office*

(12) EX PARTE REEXAMINATION CERTIFICATE (6675th)
United States Patent
Geer

(10) Number: US 5,930,778 C1
(45) Certificate Issued: Feb. 24, 2009

(54) SYSTEM FOR EXPEDITING THE CLEARING OF FINANCIAL INSTRUMENTS AND COORDINATING THE SAME WITH INVOICE PROCESSING AT THE POINT OF RECEIPT

(75) Inventor: Terry L. Geer, Baltimore, OH (US)

(73) Assignee: Datatreasury Corporation, Plano, TX (US)

Reexamination Request:
No. 90/008,682, Jun. 6, 2007

Reexamination Certificate for:
Patent No.: 5,930,778
Issued: Jul. 27, 1999
Appl. No.: 08/680,218
Filed: Jul. 11, 1996

Certificate of Correction issued May 29, 2007.

Related U.S. Application Data

(63) Continuation-in-part of application No. 08/507,856, filed on Jul. 27, 1995, now Pat. No. 5,583,759, and a continuation of application No. 08/156,190, filed on Nov. 22, 1993, now abandoned.

(51) Int. Cl.
*G06Q 40/00* (2006.01)

(52) U.S. Cl. .............................. 705/45; 235/379; 705/35
(58) Field of Classification Search .................. 235/379; 705/35, 45
See application file for complete search history.

(56) References Cited

U.S. PATENT DOCUMENTS

| 4,017,101 A | 4/1977 | Case |
| 4,172,552 A | 10/1979 | Case et al. |
| 4,201,978 A | 5/1980 | Nally |
| 4,205,780 A | 6/1980 | Burns et al. |
| 4,264,808 A | 4/1981 | Owens et al. |
| 4,268,715 A | 5/1981 | Atalla |
| 4,270,042 A | 5/1981 | Case |
| 4,321,672 A | 3/1982 | Braun et al. |
| 4,326,258 A | 4/1982 | De la Guardia |
| 4,358,671 A | 11/1982 | Case |
| 4,404,649 A | 9/1983 | Nunley et al. |
| 4,417,136 A | 11/1983 | Rushby et al. |
| 4,448,419 A | 5/1984 | Telnaes |
| 4,457,015 A | 6/1984 | Nally et al. |
| 4,500,750 A | 2/1985 | Erlander et al. |
| 4,523,330 A | 6/1985 | Cain |
| 4,555,617 A | 11/1985 | Brooks et al. |
| 4,578,530 A | 3/1986 | Zeidler |
| 4,652,990 A | 3/1987 | Pailen et al. |
| 4,675,815 A | 6/1987 | Kuroki et al. |
| 4,680,803 A | 7/1987 | Dilella |

(Continued)

FOREIGN PATENT DOCUMENTS

| CA | 2131667 | 6/1995 |
| EP | 0 454 303 | 10/1991 |
| EP | 0 481 135 | 4/1992 |

(Continued)

OTHER PUBLICATIONS

"Defendants' Motion for Summary Judgment for Claim Invalidity Based on Indefiniteness of U.S. Patent No. 5,930, 778," pp. 1–24, filed Jun. 28, 2007, in *DataTreasury Corporation v. Wells Fargo & Company, et al.*, Civil Action No. 2:06–CV–72 DF, In the United States District Court for the Eastern District of Texas, Marshall Division, Including Exhibits B–F.

(Continued)

*Primary Examiner*—Jimmy G. Foster

(57) ABSTRACT

A system and process are described for effecting the expedited submission into the payment system for collection of funds represented by financial instruments that are received by a payee at an item capture facility remote from the payee's depository bank in which the submission of the instruments into the payment system is coordinated with the payee's internal accounting process and the register of the deposit of the instruments with an account at the instruments payee's bank.

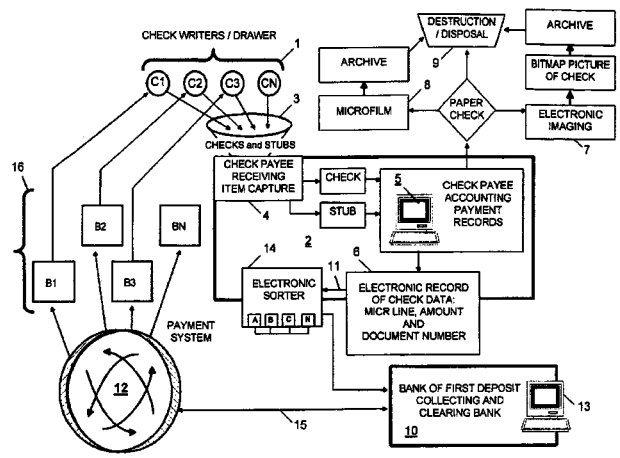

U.S. PATENT DOCUMENTS

| | | |
|---|---|---|
| 4,694,147 A | 9/1987 | Amemiya et al. |
| 4,694,397 A | 9/1987 | Grant et al. |
| 4,723,283 A | 2/1988 | Nagasawa et al. |
| 4,727,243 A | 2/1988 | Savar |
| 4,742,457 A | 5/1988 | Leon et al. |
| 4,745,267 A | 5/1988 | Davis et al. |
| 4,747,058 A | 5/1988 | Ho |
| 4,748,557 A | 5/1988 | Tamada et al. |
| 4,750,201 A | 6/1988 | Hodgson et al. |
| 4,755,940 A | 7/1988 | Brachtl et al. |
| 4,757,543 A | 7/1988 | Tamada et al. |
| 4,771,460 A | 9/1988 | Tamada et al. |
| 4,823,264 A | 4/1989 | Deming |
| 4,843,220 A | 6/1989 | Haun |
| 4,858,121 A | 8/1989 | Barber et al. |
| 4,882,779 A | 11/1989 | Rahtgen |
| 4,888,812 A | 12/1989 | Dinan et al. |
| 4,910,774 A | 3/1990 | Barakat |
| 4,912,762 A | 3/1990 | Lee et al. |
| 4,922,503 A | 5/1990 | Leone |
| 4,926,325 A | 5/1990 | Benton et al. |
| 4,941,125 A | 7/1990 | Boyne |
| 4,948,174 A | 8/1990 | Thomson et al. |
| 4,960,981 A | 10/1990 | Benton et al. |
| 4,961,142 A | 10/1990 | Elliott et al. |
| 4,962,531 A | 10/1990 | Sipman et al. |
| 4,972,463 A | 11/1990 | Danielson et al. |
| 4,974,878 A | 12/1990 | Josephson |
| 4,977,595 A | 12/1990 | Ohta et al. |
| 4,985,921 A | 1/1991 | Schwartz |
| 5,003,594 A | 3/1991 | Shinagawa |
| 5,014,311 A | 5/1991 | Schrenk |
| 5,016,277 A | 5/1991 | Hamilton |
| 5,050,078 A | 9/1991 | Sansone |
| 5,053,607 A | 10/1991 | Carlson et al. |
| 5,054,096 A | 10/1991 | Beizer |
| 5,081,680 A | 1/1992 | Bennett |
| 5,091,968 A | 2/1992 | Higgins et al. |
| 5,097,517 A | 3/1992 | Holt |
| 5,122,950 A | 6/1992 | Benton et al. |
| 5,123,047 A | 6/1992 | Rosenow |
| 5,144,115 A | 9/1992 | Yoshida |
| 5,159,548 A | 10/1992 | Caslavka |
| 5,163,098 A | 11/1992 | Dahbura |
| 5,168,444 A | 12/1992 | Cukor et al. |
| 5,170,466 A | 12/1992 | Rogan et al. |
| 5,173,594 A | 12/1992 | McClure |
| 5,175,682 A | 12/1992 | Higashiyama et al. |
| 5,175,766 A | 12/1992 | Hamilton |
| 5,185,798 A | 2/1993 | Hamada et al. |
| 5,187,750 A | 2/1993 | Behera |
| 5,195,133 A | 3/1993 | Kapp et al. |
| 5,198,975 A | 3/1993 | Baker et al. |
| 5,200,993 A | 4/1993 | Wheeler |
| 5,204,811 A | 4/1993 | Bednar et al. |
| 5,214,697 A | 5/1993 | Saito |
| 5,220,501 A | 6/1993 | Lawlor et al. |
| 5,233,656 A | 8/1993 | Landgrand et al. |
| 5,235,433 A | 8/1993 | Clarkson et al. |
| 5,237,158 A | 8/1993 | Kern et al. |
| 5,237,159 A | 8/1993 | Stephens et al. |
| 5,237,500 A | 8/1993 | Perg et al. |
| 5,241,600 A | 8/1993 | Hillis |
| 5,256,863 A | 10/1993 | Ferguson et al. |
| 5,259,025 A | 11/1993 | Monroe et al. |
| 5,265,007 A | 11/1993 | Barnhard, Jr. et al. |
| 5,274,567 A | 12/1993 | Kallin et al. |
| 5,283,829 A | 2/1994 | Anderson |
| 5,287,497 A | 2/1994 | Behera |
| 5,317,637 A | 5/1994 | Pichlmaier et al. |
| 5,321,238 A | 6/1994 | Kamata et al. |
| 5,321,751 A | 6/1994 | Ray et al. |
| 5,321,816 A | 6/1994 | Rogan et al. |
| 5,326,959 A | 7/1994 | Perazza |
| 5,337,358 A | 8/1994 | Axelrod et al. |
| 5,341,428 A | 8/1994 | Schatz |
| 5,343,529 A | 8/1994 | Goldfine et al. |
| 5,345,090 A | 9/1994 | Hludzinski |
| 5,373,550 A | 12/1994 | Campbell et al. |
| 5,396,558 A | 3/1995 | Ishiguro et al. |
| 5,408,531 A | 4/1995 | Nakajima |
| 5,412,190 A | 5/1995 | Josephson et al. |
| 5,434,928 A | 7/1995 | Wagner et al. |
| 5,436,970 A | 7/1995 | Ray et al. |
| 5,440,634 A | 8/1995 | Jones et al. |
| 5,444,794 A | 8/1995 | Uhland, Sr. |
| 5,446,796 A | 8/1995 | Ishiguro et al. |
| 5,454,575 A | 10/1995 | Del Buono |
| 5,457,747 A | 10/1995 | Drexler et al. |
| 5,473,143 A | 12/1995 | Vak et al. |
| 5,479,510 A | 12/1995 | Olsen et al. |
| 5,484,988 A | 1/1996 | Hills et al. |
| 5,502,765 A | 3/1996 | Ishiguro et al. |
| 5,506,691 A | 4/1996 | Bednar et al. |
| 5,524,073 A | 6/1996 | Stambler |
| 5,526,409 A | 6/1996 | Conrow et al. |
| 5,528,705 A | 6/1996 | Reasoner, Jr. et al. |
| 5,539,822 A | 7/1996 | Lett |
| 5,539,825 A | 7/1996 | Akiyama et al. |
| 5,544,043 A | 8/1996 | Miki et al. |
| 5,544,255 A | 8/1996 | Smithies et al. |
| 5,557,518 A | 9/1996 | Rosen |
| 5,577,121 A | 11/1996 | Davis et al. |
| 5,583,759 A | 12/1996 | Geer |
| 5,590,038 A | 12/1996 | Pitroda |
| 5,590,196 A | 12/1996 | Moreau |
| 5,596,642 A | 1/1997 | Davis et al. |
| 5,602,933 A | 2/1997 | Blackwell et al. |
| 5,602,936 A | 2/1997 | Green et al. |
| 5,604,640 A | 2/1997 | Zipf et al. |
| 5,604,802 A | 2/1997 | Holloway |
| 5,608,800 A | 3/1997 | Hoffmann et al. |
| 5,613,001 A | 3/1997 | Bakhoum |
| 5,615,269 A | 3/1997 | Micali |
| 5,621,796 A | 4/1997 | Davis et al. |
| 5,621,797 A | 4/1997 | Rosen |
| 5,623,547 A | 4/1997 | Jones et al. |
| 5,625,694 A | 4/1997 | Lee et al. |
| 5,629,981 A | 5/1997 | Nerlikar |
| 5,633,930 A | 5/1997 | Davis et al. |
| 5,642,419 A | 6/1997 | Rosen |
| 5,647,017 A | 7/1997 | Smithies et al. |
| 5,657,389 A | 8/1997 | Houvener |
| 5,657,396 A | 8/1997 | Rudolph et al. |
| 5,659,616 A | 8/1997 | Sudia |
| 5,668,897 A | 9/1997 | Stolfo |
| 5,673,333 A | 9/1997 | Johnston |
| 5,682,549 A | 10/1997 | Tanaka et al. |
| 5,708,810 A | 1/1998 | Kern et al. |
| 5,710,889 A | 1/1998 | Clark et al. |
| 5,717,868 A | 2/1998 | James |
| 5,751,842 A | 5/1998 | Riach et al. |
| 5,754,673 A | 5/1998 | Brooks et al. |
| 5,760,916 A | 6/1998 | Dellert et al. |
| 5,781,654 A | 7/1998 | Carney |
| 5,784,503 A | 7/1998 | Bleecker, III et al. |
| 5,784,610 A | 7/1998 | Copeland, III et al. |
| 5,787,403 A | 7/1998 | Randle |
| 5,790,260 A | 8/1998 | Meyers |
| 5,801,366 A | 9/1998 | Funk et al. |
| 5,825,506 A | 10/1998 | Bednar et al. |

| | | | |
|---|---|---|---|
| 5,832,463 | A | 11/1998 | Funk |
| 5,832,464 | A | 11/1998 | Houvener et al. |
| 5,857,034 | A | 1/1999 | Tsuchiya et al. |
| 5,870,725 | A | 2/1999 | Bellinger et al. |
| 5,884,271 | A | 3/1999 | Pitroda |
| 5,910,988 | A | 6/1999 | Ballard |
| 5,926,288 | A | 7/1999 | Dellert et al. |
| 5,930,778 | A | 7/1999 | Geer |
| 5,973,731 | A | 10/1999 | Schwab |
| 6,032,137 | A | 2/2000 | Ballard |
| 6,059,185 | A | 5/2000 | Funk et al. |
| 6,108,104 | A | 8/2000 | Tesavis |
| 6,115,509 | A | 9/2000 | Yeskel |
| 6,145,738 | A | 11/2000 | Stinson et al. |

FOREIGN PATENT DOCUMENTS

| | | |
|---|---|---|
| EP | 0 519 843 | 12/1992 |
| EP | 0 593 209 | 4/1994 |
| EP | 0661654 A2 | 7/1995 |
| EP | 0 671 696 | 9/1995 |
| EP | 0 678 829 | 10/1995 |
| GB | 2 251 098 | 6/1992 |
| GB | 2 294 566 | 5/1996 |
| WO | WO 90/04837 A | 5/1990 |
| WO | WO 91/06058 A | 5/1991 |
| WO | WO 92/10901 | 6/1992 |
| WO | WO 93/02424 | 2/1993 |
| WO | WO 95/12859 | 5/1995 |
| WO | WO 95/30199 | 11/1995 |
| WO | WO 97/07468 | 2/1997 |
| WO | WO 97/22060 | 6/1997 |
| WO | WO 97/36254 | 10/1997 |
| WO | WO 97/36266 | 10/1997 |
| WO | WO 97/36267 | 10/1997 |
| WO | WO 97/38402 | 10/1997 |
| WO | WO 98/47100 A | 10/1998 |
| WO | WO 98/58356 A | 12/1998 |

OTHER PUBLICATIONS

A. Greenspan, "Clearing and Settlement: Past and Future", American Banker, Oct. 26, 1990, p. 4.

"Proposals for Long–Term Improvements to the Check Collection System", American Banker Plus, Feb. 4, 1988.

"Electronic Payments Volume Will Gain at Corporations", American Banker, Dec. 5, 1983, p. 30.

"Boycott of Automated Clearing System in London is Said Close to Resolution", American Banker, Mar. 28, 1984, p. 2.

"About FSTC: FSTC History," FSTC, 2003.

American National Standard For Financial Image Interchange ("ANSI"): Architecture, Overview and System Design Specification, X9.xx 0.7, dated: 1994.

"ANSI/ABA X9.46–1995, Draft version 0.13, American National Standard for Financial Image Interchange: Architecture, Overview and System Design Specification."

"ANSI/ABA X9.46–1997, American National Standard for Financial Image Interchange: Architecture, Overview and System Design Specification." Copyright 1996.

Anderson, "Electronic Check and Check Law," letter to Robert Ballen, Apr. 8, 1996.

Ansi6v4[1].ppt—PowerPoint Presentation—FSTC—Financial Services Technology Consortium, Sep. 30 to Oct. 1, 1996.

"AT&T Global offers one–step imaging," American Banker, vol. 159, No. 39, p. 14A(1), Feb. 28, 1994.

"AT&T Partners with Fiserv to Form Single Source Provider for Leading Image Item Processing Solutions," PR Newswire, at 913CL011, Sep. 13, 1995.

Atzel, (email to Hambro, Oct. 9, 2001).

"At Your Service . . . ," Federal Reserve Bank of Kansas City, 1995.

"Baby boomers, Generation X are both addicted to ATM," AT&T News Release, Feb. 28, 1995.

"BancTec Inc. has received another order for its image statement processing product (First National Bank of Chicago orders)," Nov. 13, 1991.

BancTec's Proposal to the Federal Reserve Bank of Boston, "Technical Volume: Check Image Processing Archive and Retrieval System," Jul. 8, 1994, JPMC–BANCT 002960–003299 and JPMC–BANCT 001017–001144.

BancTec's Proposal to the Federal Reserve Bank of Boston, "Technical Volume: Total Solution Overview" Jul. 8, 1994, JPMC–BANCT 001017–001144.

Banet, B., "Document image processing, 1991: The imaging edge," Seybold Rep. on Publishing Systs, vol. 20, No. 19, Jun. 24, 1991.

"Bank Automation News," Finance & Banking Newsletter, vol. 9, Iss. 6, Apr. 2, 1997.

"Banks to Check Out Imaging (Solutions)," Communications Week International, 1992, No. 093, p. 46, Oct. 19, 1992.

Barhel, M., "NCR and Unisys exchange check images in a pivotal test (computer makers test compatibility of check imaging systems)," American Banker, vol. 158, No. 67, p. 3(1), Apr. 8, 1993.

Barthel, Matt, "Unisys, Banctec offer PC–based imaging: high–tech check statements produced; community banks are market," American Banker, vol. 157, No. 195, p. 3(1), Oct. 8, 1992.

Bartholomew, D., "More Checks on Checks—Bank of America plan to convert to an IBM imaging system that screens checks faster and more thoroughly (spotlight)," Informationweek, 1994, No. 504, p. 32, Dec. 5, 1994.

"Bill Processing: US West Re–Engineers with $7.2 Million Unisys Image–based Remittance Processing Solution," EDGE, on & about AT&T, vol. 10, No. 378, Oct. 23, 1995.

Blankenhorn, D., "Cincinnati Bell and Unisys go into bank imaging," Newsbytes, p. NEW10240020, Oct. 24, 1990.

Block, V., "USAA Federal gets imaging system," American Banker, vol. 159, No. 49, p. 6A(1), Mar. 14, 1994.

Booker, E., "Bank to test scalable NCR imaging for check processing," Computerworld, p. 66, Dec. 14, 1992.

Brown, J., "Imaging may dramatically alter bank data networks," Network World, vol. 6, No. 19, p. 6(2), May 15, 1989.

Buchok, J., "OCR gets processing credit," Computing Canada, vol. 19, No. 26, Dec. 20, 1993.

"Chase's New Image," Information Week, No. 517, at 14, Mar. 6, 1995.

Check[1].ppt—PowerPoint Presentation—Current Check Flow, Dec. 12, 1995.

"Check Image Exchange Project (a.ka. Interbank Check Imaging Project)," at www.fstc.org/projects/imaging/index.cfm.

"Check–Image Interchange Inches Closer," Bank Technology News, vol. 10, No. 1, p. 19+, Jan. 1997.

"Checks & Checking: Check Imaging at the Teller Station (Alliance Integration & Services Introduces Imaging System that can be Installed at Bank Teller Stations)," Bank Technology News, vol. 9, No. 10, at 37, Oct. 1996.

"Chemical Chooses IBM Check Imaging (Chemical Banking Corp to install IBM's ImagePlus High Performance Transaction System to process 9 mil checks daily)," Bank Technology News, vol. 8, No. 9, p. 11, Sep. 1995.

"Cincinnati Bell: CBIS & Unisys in Major Imaging Agreement," EDGE, on & about AT&T, vol. 5, No. 118, Oct. 29, 1990.

"Cincinnati Bell Information Systems (Integrator Briefs)," Computer Reseller News, 1993, No. 534, p. 129, Jul. 12, 1993.

Complaint in *DataTreasury Corp.* v. *Bank One Corp.*, Cause No. 3–03CV0059–K, In the United States District Court for the Northern District of Texas, Dallas Division.

Complaint in *DataTreasury Corp.* v. *First Data Corporation, et al.*, Cause No. 502CV094, In the United States District Court for the Eastern District of Texas, Texarkana Division.

Complaint in *Data Treasury Corp.* v. *RDM Corp., a.k.a. Research Development and Manufacturing Corp.*, Cause No. 3–02CV2641–M, in the United States District Court for the Northern District of Texas, Dallas Division.

Complaint in *DataTreasury Corp.* v. *Ingenico S.A., et al.*, Cause No. 502CV095, In the United States District Court for the Eastern District of Texas, Texarkana Division.

Complaint in *DataTreasury Corp.* v. *J.P. Morgan Chase & Co., et al.*, Cause No. 502CV124, In the United States District Court for the Eastern District of Texas, Texarkana Division.

"Computerm Announces Remote Check Imaging Support for VMC 8200 High–Speed Channel Extension System," PR Newswire at 408LAM012, Apr. 8, 1996.

"Computerm Eases Remote Imaging," American Banker, vol. 158, No. 156, at 13A(1), Aug. 16, 1993.

"Computerm Enables Boatmen's Bancshares to Execute Remote Check Imaging," PR Newswire at 408LAM013, Apr. 8, 1996.

Cooney, M., "Frame relay comes to Computer extenders," Network World, Jun. 28, 1993.

Cortese, Amy, "Image Yields Interest at Banks (Collaboration Results in Imaging System to Automate Check Processing," ComputerWorld, at 6, Mar. 19, 1990.

Costanzo, C., "As Banks Cling to the Conventional, Check–Imaging Struts Its Stuff," Bank Technology News, p. 1, Mar. 1994.

Crockett, B., "Systematics to use deposited–check imaging; installation at firm's N.J. center would be the first to outsourcer," American Banker, vol. 158, No. 95, p. 3(1), May 19, 1993.

Crone, "Reducing Data Processing Costs with a Remote Item Processing System," Bank Administration, Oct. 1986, pp. 44–46.

Daly, B., "Unisys Acquires Visual Impact Solution for Check Processing, Archive and Image Delivery," Business Wire, p. 9181204, Sep. 18, 1997.

Daly, B., "Unisys provides services to Bank of the West to support retail banking," Business Wire, p. 9180098, Sep. 18, 1995.

"Data Compression Over Frame Relay Implementation Agreement FRF.9," Jan. 22, 1996, downloaded at http://www.frforum.com/5000/Approved/FRF.9/frf9.pdf.

"Defendants' Final Invalidity Construction Pursuant to Fourth Amended Docket Control Order and Patent Local Rules 3–3 and 3–6," pp. 1–21, Civil Action No. 5:03–CV–039 (DF), Dec. 13, 2005.

"Defendants Ingenico S.A. and Ingenico, Inc.'s Preliminary Invalidity Contentions," in *DataTreasury Corp.* v. *Ingenico S.A., et al.*, Cause No. 502CV095, In the United States District Court of Texas, Texarkana Division.

"Defendants' Preliminary Invalidity Construction Pursuant to Patent Local Rules 3–3 and 3–4," in *DataTreasury Corp.*, v. *First Data Corporation, et al.*, Cause No. 502CV094, In the United States District Court of Texas, Texarkana Division.

Depompa, Barbara, "IBM Adds Image–Based Check Processing," MIS Week, vol. 11, No. 12, at 12(1), Mar. 19, 1990.

Description of the IBM "3174 Network Processor," Oct. 7, 1992, found on the web at the URL: http://ecc400.com/ibm/controllers/314prod.htm and http://www.commercecomputer.com/3174.html.

Dinan, Painter & Rodite, "ImagePlus High Performance Transaction System," IBM Systems Journal, vol. 29, No. 3, 1990, pp. 421–434.

Document Image Report, IntraFed Touts Remote Services, vol. 6, Issue 25, Dec. 11, 1996.

Dowell, "Security," email to fstc–image, Apr. 27, 1996.

Durham, D., "Broadway & Seymour to Invest in Two Strategic Initiatives," Business Ire, p. 03151248, Mar. 15, 1995.

eCheck: Homepage, 2003.

Electronic Imaging '88—Advanced Printing of Paper Summaries, vol. 1, Anaheim, California, Mar. 1988.

Electronic Imaging'88—Advanced Printing of Paper Summaries, vol. 1, Oct. 3–6, 1988, Boston, MA.

E–mail of May 10, 2006 titled "USPTO Reexam. C.N 90/007,829, Requested Date: Nov. 25, 2005" from "PT" <admin@patentrakker.com>.

"Entrust Encryption and Digital Signature Explained," date unknown.

Evankovitch, S., "Computer earns MCI 'Level 1' approval; Computer's industry exclusive native Frame Relay interface passes test for interoperability with MCI's Frame Relay services," Business Wire, Apr. 12, 1995.

Evans, J., "The end of the paper wait: document imaging (includes related articles on successful document imaging implementations at Borgess Medical Center, the Huntington Internal Medicine Group, the University of Alabama Health Services Foundation and Quest Diagnostic) (Industry Trend or Event)," Health Management Technology, vol. 18, No. 2, p. 16(5), Feb. 1997.

Fassett, W., "Impact of Imaging," Bank Management, vol. 67, No. 11, p. 56, Nov. 1991.

Federal Reserve Bank of Boston, "Request For Proposal For Check Image Processing And Archival And Retrieval Systems For The Federal Reserve," Apr. 21, 1994, JPMC 152558–152803.

Feighery, M., "NCR demonstrates systems for Insurance and accounting industry," AT&T News Release, May 31, 1992.

Feighery, M. and Bochonko, K., "NCR demonstrates full line of retail products at NRF conference," AT&T News Release, Jan. 18, 1993.

FileNet Product Brochure, "Introducing the Age of Document–Image Processing," The PC Connection, and Wide–Area Image Communication and System Networking, 1998, 14 pages.

"Financial EDI over the Internet," Bank of America, 1996.

Financial Services Technology Consortium ("FSTC") Interbank Check Imaging Project White Paper, dated: Jun. 20, 1994.

Fisher, M., "IBM, Customers continue work on document image processor," Datamation, vol. 34, No. 19, Oct. 1, 1988.
Fitch, "Digital image systems speed return items, exceptions," Corporate Cashflow, May 1996.
Fitch, T., "Check image capture speeds up positive pay reconcilement," Corporate Cashflow, Feb. 1995.
Friedman, D., "Nixdorf Computer Introduces DCPA Image—A Sophisticated Document Image Processing System With Unique Capabilities," PR Newswire, Aug. 15, 1989.
FSTC Check Image Interchange Project, dated: May 25, 1995.
FSTC Check Image Interchange Project Pilot Phase 1A: Preliminary Architecture and Project Plan, dated: Jun. 30, 1995.
"FSTC Check Image Quality Subproject," date unknown.
FSTC Compilation of ANSI X9.46, Data Structure Reference, dated: Jul. 31, 1995.
FSTC Demonstrates Interbank Check Image Pilot; Multi-Vendor System Speeds check Clearing, Cuts Fraud—FSTC Pilot Lays Foundation for "Paper Check Truncation," at www.fstc.org/projects/imageing/public/information.cfm, Dec. 12, 1995.
"FSTC Image Exchange," May 21, 1996.
FSTC Image Quality Functional Requirements, dated: Jul. 26, 1995.
FSTC Interbank Check Imaging: Unisys Monthly Status Report, Jun. 26, 1996.
"FSTC Interbank check Imaging: Unisys Monthly Status Report," Jul. 22, 1996.
FSTC Pilot Overview, dated: Apr. 3, 1995.
"FSTC: Projects—Check Image Exchange Project—Project Participants," at www.fstc.org/projects/imaging/participants.cfm.
FSTC Projects: The Bank Internet Payment System (BIPS): Leading the Way to Electronic Commerce, FSTC, 2003.
Garvey, M., "Check Processing Goes Digital—Chase Manhattan Bank to store checks electronically, saving time and money," Informationweek, 1997, No. 648, p. 20, Sep. 15, 1997.
Gawen, "PC Based Document Image Processing and Signature Verification," Proceedings of the Information & Image Management Conference, 1991, pp. 389–391.
"Global Concepts—Payment Systems Consulting," at www.global–concepts.com/image_archive.htm.
Griffith, M. and Mazzola, J., "National City, NCR form strategic imaging partnership," AT&T News Release, Nov. 9, 1992.
Gullo, K., "NCR Unisys plan check imaging for IBM Systems," American Banker, vol. 156, No. 249, p. 1(2), Dec. 30, 1991.
Haig, J., "Unisys integrates retail/wholesale lockbox solution for remittance processors," Business Wire, p. 03251075, Mar. 25, 1997.
Haig, J., "Unisys solution will suupport check processing at Vermont Federal," Business Wire, p. 5201185, May 20, 1996.
Helm, Sylvia, "Banks check into image processing," Computers in Banking, vol. 7, No. 3, p. 25(7), Mar. 1, 1990.
Helm, S., "Who's doing what in image processing (includes definition of image processing," ABA Banking Journal, vol. 83, No. 1, p. 31(3), Jan. 1991.
"High Volume Data Capture Sans Paper" in Bank Systems Technology, May 1996, p. 35.

Homa, "MICR Technology Helps Eliminate POS Check Fraud," Chain Store Age Executive, Sep. 1991.
Horine, J., "AT&T and Fiserv team to offer imaging solutions," Sep. 13, 1995.
"Huntington BancShares in the Forefront of Technology with Purchase of Unisys Check Imaging System," PR Newswire, p. 1, Oct. 11, 1989.
IBM Electronic Payment Systems Support/Check Processing Control Systems: Progress Reference and Operations Manual, dated: Jun. 1986.
"IBM FSTC Pilot Status".
IBM Product Announcement 190–040, (IBM 3898 Image Processor), dated: Mar. 13, 1990.
IBM's Proposal to the Federal Reserve Bank of Boston, Nov. 7, 1991, "IBM Proposal For FRB Phase Four: Image Archive System," JPMC 279955–280128, Yeskel Exhibit 1.
IBM Systems Journal, vol. 29, No. 3, 1990 (entire journal).
"IBM X9.46 Pilot Status—Summary," date unknown.
"Ibnamed, A Load Balancing Name Server Written in Perl," Sep. 17, 1995, located at the web at URL www.standford.edu/~schemers/docs/Ibnamed/Ibnamed.html.
"Ibnamed, A Load Balancing Name Server Written in Perl," Oct. 15, 2002, found on the web at the URL www.stanford.edu/~schemers/docs/Ibnamed/Ibnamed.html.
"ICI Project Security Work Session," May 10, 1996.
Image Archive Forum Flow Nos. 1–13, Sep. 1997.
Image Archive Forum Methodology and Value, Sep. 19, 1997.
Image Archive Forum, "Payment Systems Task Force Economic Framework," Jan. 27, 1998.
ImagePlus brochure by IBM, 1991.
"Image Processing Survival Guide, vol. 11: Sure–Fire Strategies for Implementing Image Remittance," Philips Business Information, Inc., 1996.
"Image systems garner NOAC spotlight (American Bankers' Association's National Operations and Automation Conference)," Computer in Banking, vol. 6, No. 7, p. 8(4), Jul. 1989.
"Imaging in Corporate Environments: Technology and Communication," Daniel Minoli, McGraw Hill, 1994.
"Imaging products. Check Processing—IBM's ImagePlus High Performance Transaction System," United States Banker, vol. 100, No. 8, p. 23(3), Aug. 1990.
"Imaging vendors shape processing," Banking Management, vol. 69, No. 4, p. 29, Apr. 1993.
Imwalle, C. and Pratt, J., "250 U.S. banks to use NCR, Cincinnati Bell financial systems," AT&T News Release, May 4, 1993.
"Industry Security Leader Racal Supports Visa/Mastercard Proposal for Internet," PR Newswire, Apr. 17, 1996.
INSPEC search with abstracts.
"Interbank Check Imaging," FSTC General Meeting, Orlando, FL, Apr. 17, 1997 (Exhibit 20).
"Item processing leaps ahead with VisualImpact and Windows NT (Sponsored Supplement: Unlock Your Back Office with Microsoft Back Office)," US Banker, vol. 105, No. 6, p. S4(3), Jun. 1995.
Janusky, "FSTC Interbank Check Imaging," Apr. 29, 1996.
Janusky, "FSTC Interbank Check Imaging," May 22, 1996.
Joint Marketing & Referral Agreement Between ACS Image Solutions, Inc. and JPMorgan Chase Bank.
Jones, J., "Broadway & Seymour Announces Client/Server Product for Item and Image Processing," Business Wire, p. 03201186, Mar. 20, 1995.

Jones, J., "Broadway & Seymour announces new Visualimpact release," Business Wire, p. 3291274, Mar. 29, 1996.

Klein, M., "Terminal Data to supply NCR with document microfilmers," AT&T News Release, Oct. 13, 1993.

Kraynak Maxfield, J., "Signet Processes Over 2,500 Documents/Hour in Unisys Check Imaging Tests," PR Newswire, p. 0409P8428, Apr. 9, 1991.

Kriskern, J., "Engineering a visionary solution," Datamation, vol. 36, No. 8, Apr. 15, 1990.

Kutler, J. "AT&T, IBM, Unisys join bank research group," American Banker, vol. 159, No. 124, p. 14(1), Jun. 29, 1994.

Lubetkin, S., "Unisys enters image processing market with two new products and major financial and industrial customers (product announcement)," PR Newswire, p. 1011PH009, Oct. 11, 1989.

"MAGTEK® Company Background & Product Guide," date unknown (Exhibit MagTek D–7).

"MagTek Unveils Excella, a Dual–side Scanner for Check 21 Applications," May 10, 2004 (Exhibit MagTek D–8).

Mantel, K., "Notes Gets in the Picture," Datamation, Jul. 15, 1992.

Marjanovic, "Payment Groups Square Off Over Electronic Check Plan," American Banker, date unknown.

Marjanovic, S., "Mich. National streamlines imaging with IBM system (check imaging)," American Banker, vol. 160, No. 176, Sep. 13, 1995.

Marjanovic, Steven, "Home Loan Bank to Offer Check–Image Statements to Members' Customers," American Banker, vol. 159, No. 248, at 14(1), Dec. 29, 1994.

Mazzola, J., "NCR and NYCH to develop image–based check notification system," AT&T News Release, Aug. 24, 1992.

Mazzola, J. and Hendrickson, L., "NCR deposit processing technology speeds banking operations," AT&T News Release, Dec. 7, 1992.

Mazzola, J. and Hendrickson, L., "Wachovia tests NCR's new imaging item processing system," AT&T News Release, Nov. 15, 1991.

Mazzola, J., Hendrickson, L. and Gatati, G., "NCR signs DSI alliance for imaging statement processing," AT&T News Release, Jul. 20, 1992.

Mazzola, J., Hendrickson, L., and Waters, R., "NCR, CKI to market image–based credit card chargeback system," Jan. 6, 1993.

Mazzola, J. and O'Donohue, M., "Frost National Bank selects NCR over old mainframe environment," AT&T News Release, Apr. 28, 1993.

McGinn, Janice, "IBM ImagePlus High Performance Transaction System (IBM Harnesses Image Processing to Make its 389x/XP Cheque Processors More Efficient)," Computergram International, No. 1389, at CG103210008, Mar. 21, 1990.

McKee, K., and Gundlach, D., "Retail Banking Solution enhanced," AT&T News Release, May 21, 1990.

Messmer, E., "Hurdles stand in way of electronic banking," Network World, p. 33, Sep. 4, 1995.

"Microsoft Introduces SNA Server Version 3.0, Begins Beta Testing," Microsoft Press Release, Aug. 29, 2006, found at: http://www.microsoft.com/presspass/press/1996/jun96/sna30pr.mspx.

Moore, J., "IBM, Unisys test check systems for Fed Reserve," Federal Computer Week, vol. 6, No. 21, p. 6(2), Jul. 27, 1992.

Moreau, Thierry, "Payment by Authenticated Facsimile Transmission, a Check Replacement Technology for Small and Medium Enterprises," Nov. 25, 2006, found at: http://connotech.com/PAYPROC.HTM.

Morris, H.M. and Orth, R.H., Image system communications, IBM Systems Journal, vol. 29, No. 3, 1990, pp. 371–383.

Murphy, P., "POD Check Imaging Faces Challenges (In 1995, vs. 1996, banks raised Investment in check imaging by 9% from $198 mil and $215 mil; new lost cost POD technology keeps costs down)," Bank Technology News, vol. 10, No. 3, p. 23, Mar. 1997.

"NCReports: Financial Services Trends and Technologies," Issue 1, NCR, Jan. 1997.

"NCReports: Financial Services Trends and Technologies," Issue 2, NCR, Jan. 1997.

"NCReports: Financial Services Trends and Technologies," Issue 3, NCR, Jan. 1997.

"NCReports: Financial Services Trends and Technologies," Issue 4, NCR, Jan. 1997.

"NCReports: Financial Services Trends and Technologies," Issue 5, NCR, Jan. 1997.

"NCReports: Financial Services Trends and Technologies," vol. 1, Issue 6, NCR, Jan. 1997.

"NCReports: Financial Services Trends and Technologies," vol. 1, Issue 7, NCR, 1997.

"NCReports: Financial Services Trends and Technologies," vol. 1, Issue 8, NCR, 1999.

NCR 7780 Brochure, copyrighted 1989.

"NCR—Hardware—7780 Mid–Range Item Processing Transport," at www.ncr.com/products/hardware/hw_7780_product.htm.

"NCR—Hardware—7780, Technical Specifications," at www.ncr.com/products/hardware/nw_7780_ts_product.htm.

"NCR offers new image–based Document Management System," AT&T News Release, Jun. 23, 1992.

"NCR Unveils Client–Server Check Imaging," Bank Technology News, vol. 9, No. 3, p. 23, Mar. 1, 1996.

Nixon, B., "Is check imaging for you? (automation in banking) (includes related article)," Savings & Community Banker, vol. 2, No. 10, p. 28(6), Oct. 1993.

No1016v4[1].ppt—PowerPoint Presentation—FSTC—Interbank Check Image Project, Sep. 30 to Oct. 1, 1996.

"NSSDC's Mass Storage System Evolves," Mar. 1995, found on the web at the URL: http://nssdc.gsfc.nasa.gov/nssdc_news/march95/09_i_behnke_0395.html.

O'Heney, S., "Prepare for the image revolution (Banker and Vendors) (image processing: includes related article listing image processing products) (buyers guide)," Computers in Banking, vol. 6, No. 10, p. 24(6), Oct. 1989.

"On the imaging technology front," American Banker, vol. CLXI, No. 68, p. 26, Apr. 10, 1996.

PACESBusReq3[1].doc—Microsoft Word Doc—"PACES Paperless Automated Check Exchange & Settlement—Business Requirement," Apr. 3, 1998.

PacesOverview40[1].ppt.—PowerPoint Presentation.

PACESPRO[1].doc—Microsoft Word Doc—"PACES Paperless Automated Check Exchange & Settlement—Project Proposal," Apr. 23, 1998.

PACESRequirements[1].doc—Microsoft Word Doc—"PACES Paperless Automated Check Exchange & Settlement—Requirements Document," Apr. 3, 1998.

"PACES Models—FSTC Project," presentation by Mariano Roldan on Jul. 17, 1997 (Exhibit 21).

"PACES Paperless Automated Check Exchange & Settlement Next Step," presentation by John Fricke at New York, NY on Aug. 12, 1997 (Exhibit 19).

Plesums, C.A. and Bartels, R.W., Large Scale Image Systems: USAA Case Study, IBM Systems Journal, vol. 29, No. 3, 1990, pp. 343–355.

"Preliminary Invalidity Contentions of Defendants J.P. Morgan Chase & Co. and JPMorgan Chase Bank," in *DataTreasury Corp. v. J.P. Morgan Chase & Co., et al.,* Cause No. 502CV124, In the United States District Court for the Eastern District of Texas, Texarkana Division.

"Press Release, Cisco Partners with AT&T on Network Switch Manufacturing," Sep. 26, 1995, found on the web at http://www.lucent.com/press/0995/950926.mma.html.

Press Release "MagTek Adds Enhanced Reading to MicrimageTM," Jan. 9, 2003 (Exhibit MagTek D–11).

Press Release "MagTek Upgrades Its MicrimageTM Check Reader/Scanner," Jun. 12, 2002 (Exhibit MagTek D–9).

Press Release "MagTek's MICRImage Transmits Check Images at Speed of Ethernet," Feb. 14, 2002 (Exhibit D–10).

Press Release, "NCR Document Management System Includes Kodak, Ricoh Products," Apr. 6, 1993.

Press Release, "NCR Introduces Scalable Image Item Processing Solution," Jan. 19, 1996.

"Regions Bank Selects ImageSoft to Provide Image Solutions," Business Wire, at 9161220, Sep. 16, 1997.

Rivest, R.L., Shamir, A., Adleman, L., "A Method for Obtaining Digital Signatures and Public–Key Cryptosystems," date unknown.

Robinson, G., "Universal Card purchases BancTec Image-FIRST system," AT&T News Release, Dec. 22, 1992.

Roldan, Jr., "Image Quality White Paper," FSTC, 1999.

Roldan, M., "Paperless Automated Check Exchange and Settlement (PACBS) (status update) (PACES completes specification and design of image exchange environment and is accepted as part of SVPCO Image Strategy," FSTC, at www.fstc.org/projects/paces/index.cfm, Jun. 22, 2000.

Roldan, Mariano, Financial Services Technology Consortium, "PACES Paperless Automated Check Exchange & Settlement Project Overview, PACES Planning Meeting, New York City," Dec. 19, 1997.

Schwartz, J., "Banks to Test Imaging for Clearing Checks," Communications Week, No. 420, p. 35, Sep. 14, 1992.

Search Report for PCT/US00/33010, Jun. 21, 2002.

Softchec Licenses 'Envision' Image Solution to West Suburban Bank, PR Newswire, at 116SETUU002, Jan. 16, 1996.

"Special Report: Fine Tunning of the Terminal Picture," Computerworld, Aug. 1983.

Spencer, H., "Scanning goes vertical: a big future for specialized check scanning; check scanning technology," Advanced Imaging, No. 10, vol. 12, p. 54, Oct. 1997.

Stellwag, C., "New ATM from AT&T GIS features automated document processing," AT&T News Release, Nov. 29, 1994.

Stellwag, C. and Bochonko, K., "NCR and Cincinnati Bell offer image processing service," AT&T News Release, Jan. 11, 1994.

Stellwag, C. and Bochonko, K., "Norwest Bank selects NCR item processing systems for lockbox," AT&T News Release, Aug. 2, 1993.

Stellwag, C., Graves, T., and Bochonko, K., "New Mexico uses NCR imaging systems for tax, revenue processing," AT&T News Release, Jul. 12, 1993.

Stellwag, C., Proto, J., and Bochonko, K., "CashFlex selects NCR item processing systems for lockbox," AT&T News Release, Jul. 12, 1993.

Stellwag, C., Roedel, R, and Bochonko, K., "NCR and Arkansas Systems announce strategic alliance," AT&T News Release, Jul. 12, 1993.

Stellwag, C., Sanders, G., and Bochonko, K., "NCR and Signet Banking to provide item processing services," AT&T News Release, Jul. 13, 1993.

"SurePOS ACE Electronic Payment Support PRPQ for 4690 OS," Version 1, Release 5, IBM, 1998, 2002.

"The Check Information Age: Vision Executive Summary Image Archive Forum, Payment System Task Force," Jan. 27, 1998.

"The Wachovia Story," Research, Development Manufacturing Corporation, 1993.

"The New Era of Check Scanning Technology," 2005 (Exhibit MagTek D–6).

Tracey, Brian, "IBM Unveils First Stage of Image–Check System," Computers in Banking, vol. 7, No. 4, at 12(3), Apr. 1990.

Tucker, T., "Broadway rolls out check imaging system for community banks," American Banker, vol. 160, No. 61, p. 14(1), Mar. 30, 1995.

"Understanding EDI," 1996.

"Unisys Enhances Check Imager (Unisys Corp makes effort to appeal to wider range of financial institutions)," American Banker, vol. CLIX, No. 205, p. 15A, Oct. 24, 1994.

Unisys, New York Clearing House, "A Proposal for an Image–Based Return Item Processing System," Jun. 1991, Unisys Document No. PDC 1010–16, JPMC–NYCH018091–018216.

"Unisys Wins Contract to Supply Imaging Solution to Chase Manhattan/FISER V Check Processing Alliance," Business Wire, at 6121175, Jun. 12, 1995.

"Unix–Based Image Statement Software," ABA Banking Journal, vol. 85, No. 2, at 80(1), Feb. 1993.

"Verifone Software Links PCs to the Point of Sale," American Banker, vol. 158, No. 156, at 13A(1), Aug. 16, 1993.

Vermeire, "Prosecution of Check Image Patent," letter to Hanna, Jul. 11, 1997.

Wagner, M., "Banc One checks out Web," Computerworld, vol. 30, No. 35, p. 69, Aug. 26, 1996.

Western Bank purchases NCR's Document Managing system, AT&T News Release, Aug. 31, 1993.

Uniform Commercial Code (U.C.C.), 1990 Revision, §§ 3–204, 3–401, 3–402, 4–101–Official Comment 2, 4–103, 4–206.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

Claims 8–18 were not reexamined.

* * * * *